Figure 1:
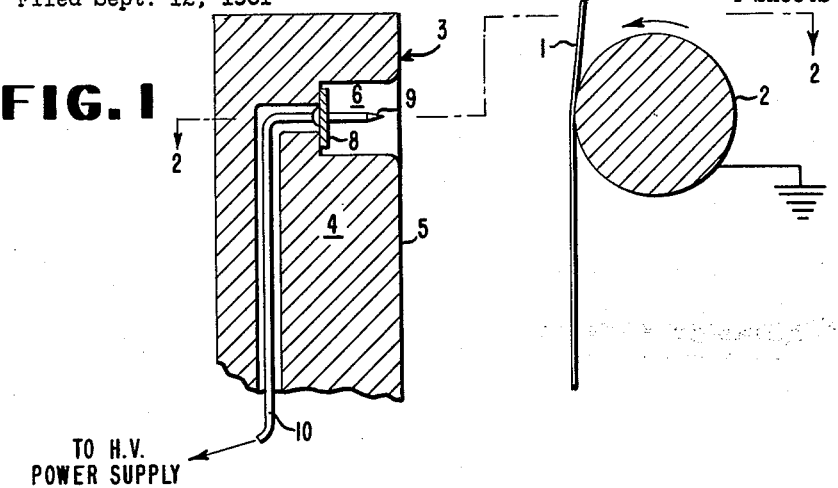

Dec. 29, 1964  C. A. DI SABATO ETAL  3,163,753
PROCESS AND APPARATUS FOR ELECTROSTATICALLY
APPLYING SEPARATING AND FORWARDING FORCES
TO A MOVING STREAM OF DISCRETE ELEMENTS
OF DIELECTRIC MATERIAL
Filed Sept. 12, 1961  4 Sheets-Sheet 1

TO H.V. POWER SUPPLY

INVENTORS
CHARLES ALFRED DI SABATO
JOHN EDWARD OWENS
BY
Harry E. Bullock
ATTORNEY

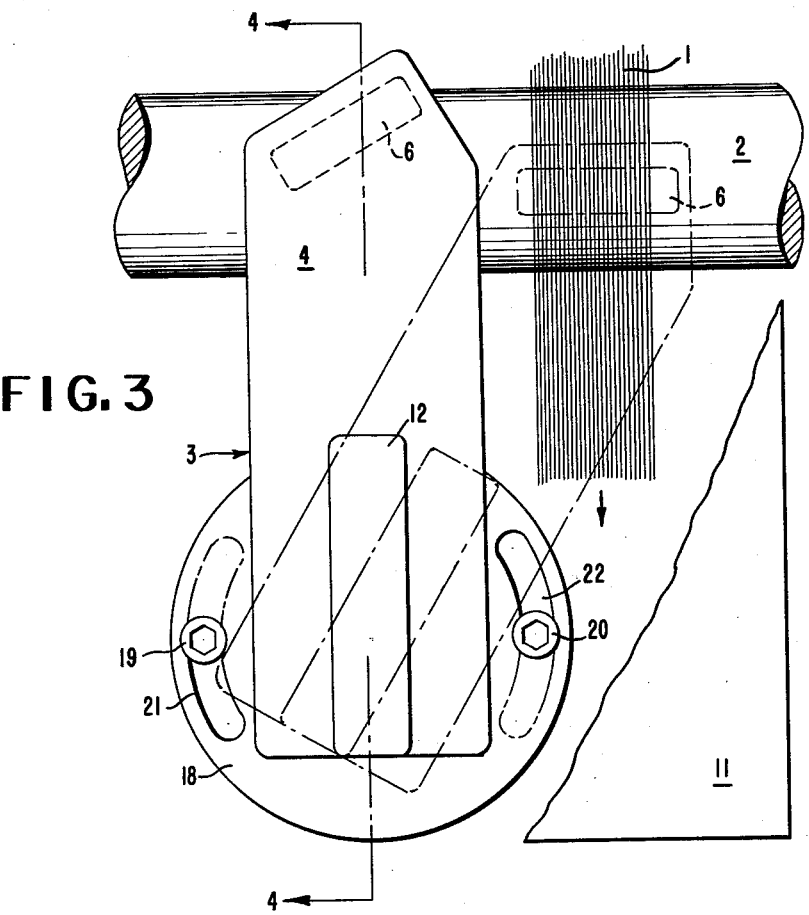
FIG. 3
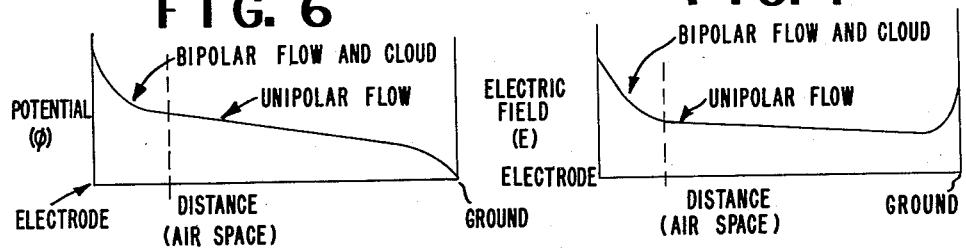
INVENTORS
CHARLES ALFRED DI SABATO
JOHN EDWARD OWENS
BY *Harry C. Braddock*
ATTORNEY

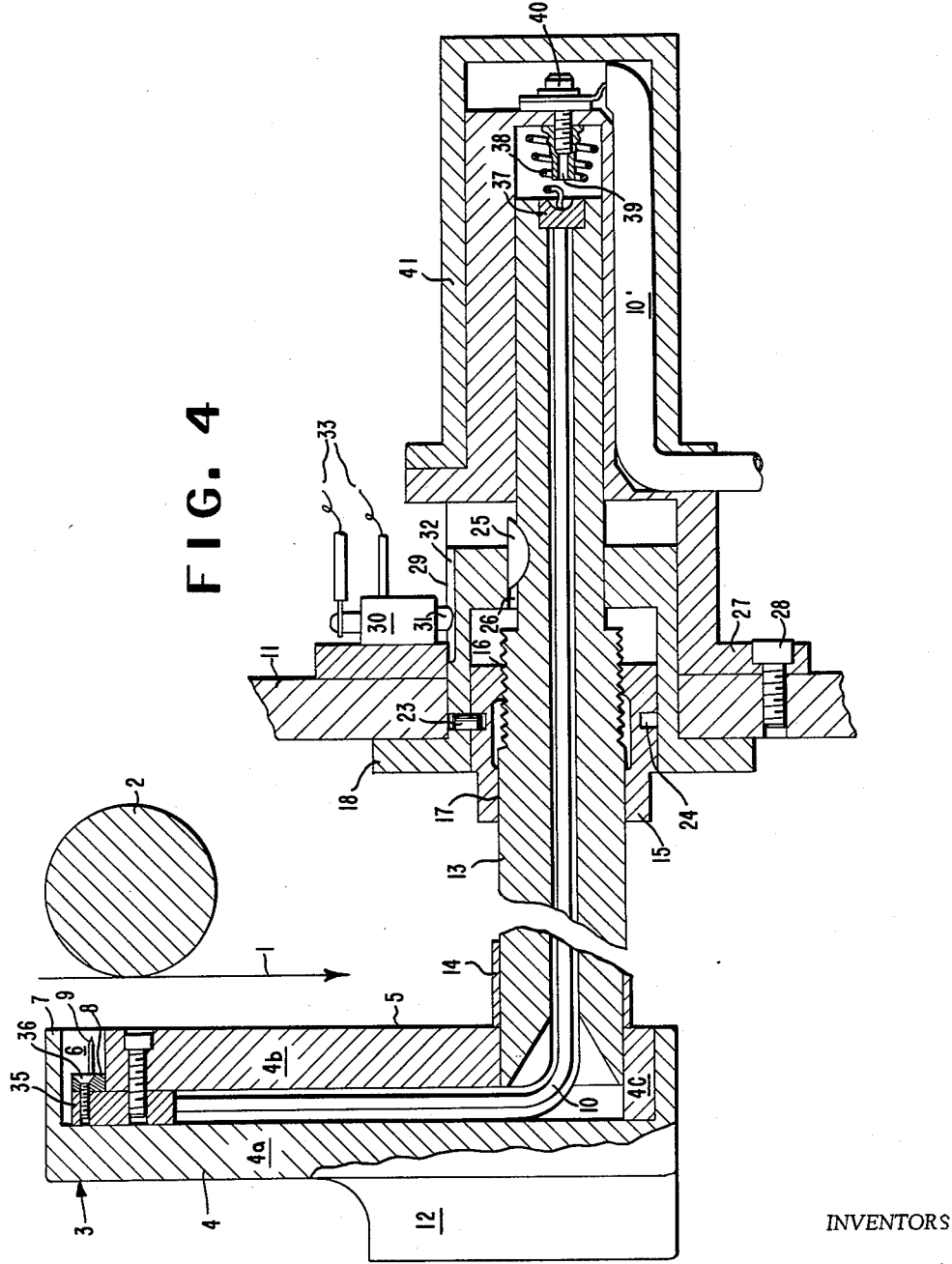

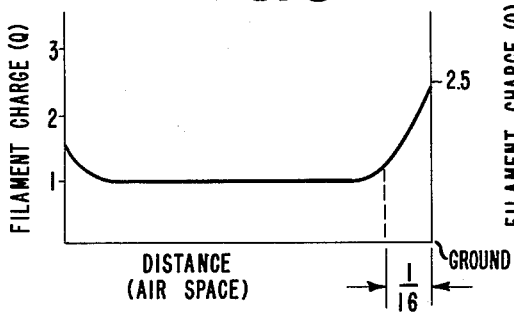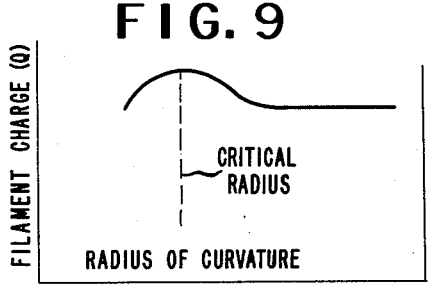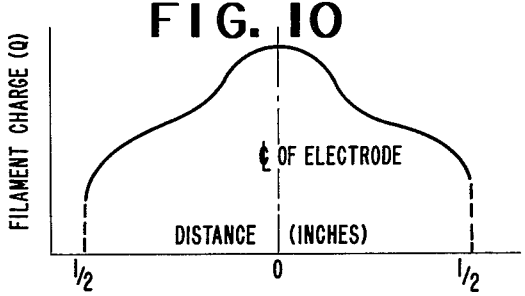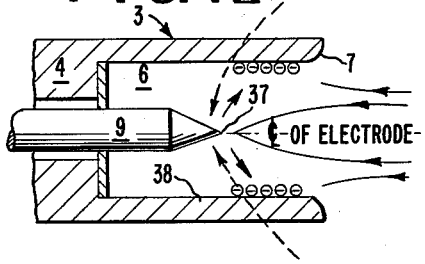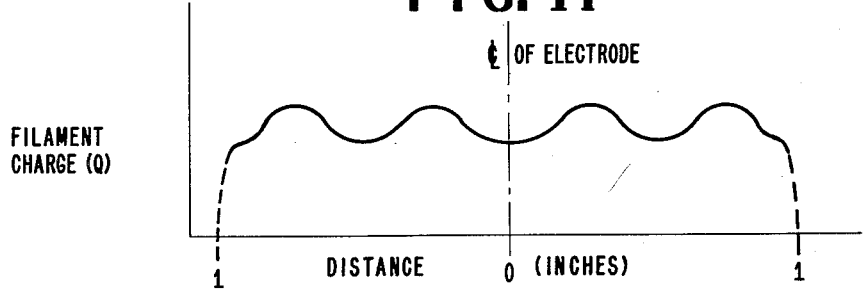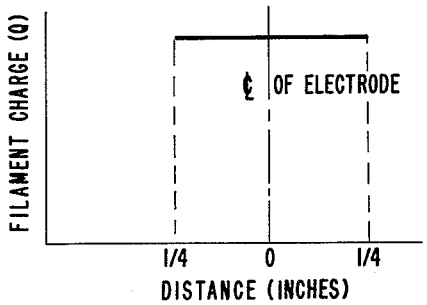

United States Patent Office 3,163,753
Patented Dec. 29, 1964

3,163,753
PROCESS AND APPARATUS FOR ELECTROSTATI-
CALLY APPLYING SEPARATING AND FOR-
WARDING FORCES TO A MOVING STREAM OF
DISCRETE ELEMENTS OF DIELECTRIC MA-
TERIAL
Charles Alfred Di Sabato, Philadelphia, Pa., and John Edward Owens, Wilmington, Del., assignors to E. I. du Pont de Nemours and Company, Wilmington, Del., a corporation of Delaware
Filed Sept. 12, 1961, Ser. No. 137,575
13 Claims. (Cl. 250—49.5)

This invention relates to process and apparatus for placing electrostatic charges on dielectric material and particularly to corona discharge means employed in charging continuously forwarded dielectric materials, particularly those materials of discrete form especially those in the form of continuous filaments and still more especially those of synthetic organic polymeric structure.

In handling of dielectric materials, it is known to place an electrostatic charge upon the surface of the material to the end that electrostatic forces may be usefully employed in the further processing. Ordinarily, the dielectric materials so acted upon are those more generally classified as webs, fibers, filaments, films, or thin sheets. A charge, having been placed upon the surface of such a dielectric material, electrostatic forces between like charges may be employed to separate units of the material or to physically guide the motion or location of such filaments. Similarly, the attractive forces between unlike charges and the forces between charges and fields may be used to either forward or guide units of the material. The electrostatic charge may be generated in one of a number of ways. One such mode takes into account the phenomenon of triboelectricity in which the result of the contact and separation of dissimilar materials creates an electrostatic charge on the surface of the materials and in which the sign (polarity) of the charge and the magnitude of the charge is determined by the nature of the contacting surfaces and the type and character of the contact, and in addition is influenced by ambient conditions. This method is difficult to control, of poor reliability, and often requires a contact that damages the surface of delicate materials. Generally the triboelectric quality of the contacting or rubbing surface rapidly deteriorates and so requires frequent interruptions of the operation to permit cleaning or regeneration. Another known technique for electrostatically charging a surface is the use of high energy particle bombardment of the surface of the material to stimulate emission of ions therefrom, leaving the material in a charged state. This, however, is ordinarily both expensive and hazardous and produces other effects which may not be desired. Still another method comprises placing the material in an electrostatic field in such a manner that charges are induced within the dielectric material. This method, while advantageous, ordinarily permits charging to a relatively low level and upon de-energizing the field the effect starts to diminish. Still another way of charging employs flooding the surface of the dielectric material with appropriately charged ions from some source. This may be accomplished as a secondary effect from some source of ionizing radiation with the aforementioned accompanying problems of expense and hazard, by high energy particle bombardment of a given surface to stimulate emission of ions therefrom, these ions then being directed to the material to be charged, or it may more conveniently be accomplished by employing an electrostatic field of such a magnitude that the phenomenon of corona discharge occurs. It is with this latter technique that this invention is concerned.

A corona discharge is the electrical discharge occurring in a gas surrounding a conductor when the potential gradient at a point in a nonuniform electric field exceeds the critical value for ionization causing a local self-sustaining discharge. It is a phenomenon particularly associated with sharply curved electrodes and essentially occurs in a limited region near the electrodes, the rest of the gap carrying a so-called dark current. The magnitude of the electric field gradient required to produce a corona discharge is the same as that required to produce arcing; the difference between the two being that in corona the critical value has been reached only in a limited region of the breakdown path between electrodes.

Corona charging as hitherto employed in material handling has resulted in a charge level considerably less than the theoretical saturation charge of an equivalent conductor. For fibers, this value is calculated by the formula $Q_{st}=167R_s$, where $Q_{st}$ is the theoretical saturation charge in microcoulombs per meter of length of a conducting filament of equal circular cross section based on a maximum electric field in air of $3 \times 10^6$ volts per meter, $R_s$ is the radius of the fiber in meters. In fact, the charge level achieved ordinarily is disappointingly low. Thus, the prior art requires a high power input to produce at best only moderate charge levels in the material being handled. Nevertheless, it is known that a dielectric material may be charged to a level exceeding that of an equivalent conductor. The formula above is useful only as an order of magnitude approximation for comparative purposes.

It is an object of this invention to place an electrostatic charge on dielectric materials continuously forwarded through a charging zone in an improved manner utilizing novel apparatus. It is an object to charge dielectric materials comprising a plurality of moving continuous polymeric filaments. It is a further object to do so by means of a novel corona discharge arrangement and it is yet a further object to do so efficiently and reliably and in a non-hazardous manner. And it is yet a further object to place a controlled optimum quantity of electrical charge on the surface of a continuous multifilament textile fiber continuously forwarded through a charging zone and to do so with minimal physical disturbance to the fibers and the surfaces thereof. It is still a further object to deposit a uniform stable charge of maximum quantity approaching in level or exceeding the theoretical saturation charge of an equivalent conductor.

These and other objects are accomplished by a novel and improved arrangement for forwarding a dielectric material through a corona charging zone in that region of the zone characterized by essentially unipolar ion flow.

According to the present invention, the objects are attained in a process and apparatus arrangement utilizing an electrically charged electrode, preferably negative, having at least one and preferably more points disposed in line and spaced apart and an associated shield in spaced relationship to a cylindrical ground element between which point electrode and ground element a shaped, intense electric field is established, containing a region of high and substantially unipolar ion charge density in proximity to the surface of the ground through which region a plurality of continuous moving polymeric filaments are passed, each filament preferably in light brushing contact with the ground element to thereby acquire a near theoretical saturation or greater electrostatic charge, the associated shield in cooperation with the electrode spacing being so disposed as to focus the region of high and substantially unipolar ion charge density over that portion of the ground element in brushing contact with the filaments, the tips of the one or more electrodes being recessed within the outer surface of the shield.

We have found that the process and apparatus of our invention produces an ion density exceeding that of any other known practical method and is readily controlled.

Figure 2:
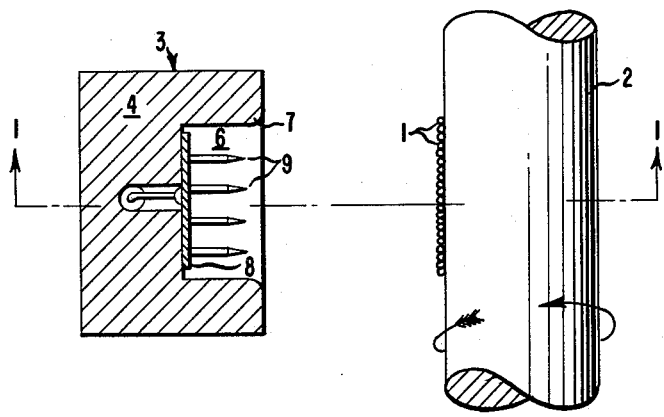
Figure 5:
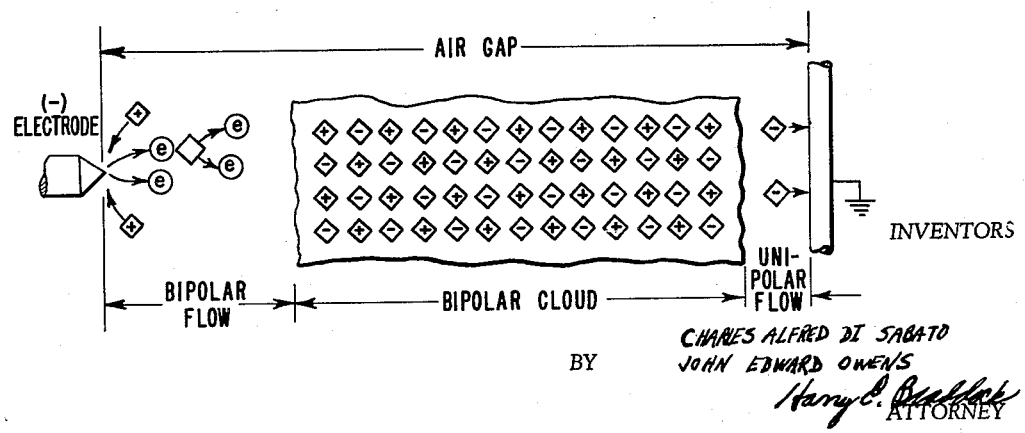

The above and further objects of the present invention will become apparent from a reading of the following description wherein the present invention is described in further detail in connection with the accompanying drawings in which:

FIGURE 1 is a fragmentary elevational view in cross section of a preferred embodiment of the invention taken on line 1—1 of FIGURE 2, FIGURE 2 is a plan view in partial cross section taken on line 2—2 of FIGURE 1, FIGURE 3 is a front elevational view of an ion gun according to the invention mounted in nonoperative or string-up position relative to its ground arrangement with indication of the operative position thereof shown in broken lines, FIGURE 4 is a side elevational view taken on line 4—4 of FIGURE 3 and in partial cross section showing the mounting system employed in the preferred embodiment of the invention, FIGURE 5 is a schematic illustration of regions believed to exist between the electrode and ground element of a point to plane system as used in the instant invention, FIGURE 6 is a plot of electrostatic potential as a function of distance from electrode to ground in a coaxial corona system, FIGURE 7 is a plot of electric field as a function of distance from electrode to ground in a coaxial corona system, FIGURE 8 is a plot of fiber charge as a function of distance from electrode to ground in the instant system, FIGURE 9 is a plot of the filament charge as a function of the radius of curvature of the ground at a constant electrode voltage in the system of the invention, FIGURE 10 is a plot of filament charge as a function of location measured along the ground surface axially from the point of intersection of the center line of the electrode and the surface of the ground for a single point electrode without the shield of the invention, FIGURE 11 is a plot of filament charge as a function of location measured along the ground surface axially from the point of intersection of the center line of the electrode and the surface of the ground for a multipoint electrode without the shield of the invention, FIGURE 12 is an elevational view in cross section of a single point electrode of the invention enclosed within its shield with schematic indication thereon of the focusing function, FIGURE 13 is a plot of filament charge as a function of position along the ground surface measured axially as in FIGURE 10 for a similar single point electrode employing the shield of the instant invention.

Referring now to the particular embodiment of the invention as shown in the figures, in FIGURES 1 and 2 there is seen a continuously forwarded dielectric material which for convenience is considered to be a plurality of synthetic organic filaments 1, moving in the direction of the arrow and restrained in its spatial distribution by means not shown in the figure. Filaments 1 are in brushing contact with ground electrode 2. Electrode 2 is supported by means not shown so that it is rotatable in either direction, the direction preferred being shown by the arrow, at some relatively low rotational speed, ordinarily between 1 and 5 revolutions per minute, and is suitably connected, also by means not shown, but indicated schematically to electrical ground. Spaced from ground electrode 2 is electrode assembly or ion gun 3 comprising housing 4 and at least one and preferably more point electrodes 9 disposed in a cavity 6 as the main features thereof. Housing 4 is essentially rectangular in cross section. Face 5 of housing 4 is disposed toward ground electrode 2 and has machined within it a cavity 6 which is substantially a parallelepiped in form. The outer edges 7 of cavity 6 constitute a local curvature and are radiused to minimize the possibility of the shield initiating unwanted corona. Within cavity 6 there is shown base plate 8 fastened within the cavity my means not shown. Point electrodes 9 are swedged or otherwise mechanically and electrically connected to base plate 8 and high voltage power supply conductor 10 is electrically fastened to plate 8 and, not shown in FIGURE 1, is connected to the source of high voltage power supply. The spacing of the electrodes 9 and 2 is such that in operating position the line of electrodes 9 is parallel to the rotational axis of ground electrode 2, and electrodes 9 are disposed opposite the general area occupied by filaments 1.

Referring now to FIGURES 3 and 4, further details will be disclosed concerning the arrangement of electrode assembly or ion gun 3 and the manner of controlling the spatial relationship of ion gun 3 to ground electrode 2 will be made apparent. Block 4 may be built up of parts 4a, 4b, and 4c, these parts being fabricated from a suitable insulating material such as any of the well known thermoplastic materials or block 4 may be molded or otherwise manufactured from one solid piece of such material. If, however, built up from a number of parts, an appropriate manufacturing technique requires these be adhesively fastened or otherwise hermetically sealed to limit the possibility of high voltage leaks through any joints therein. It will be seen that cavity 6 is machined in block 4 at an angle to the major length dimension such that when in operative position as shown in broken lines in FIGURE 3, electrodes 9 are disposed spaced from but parallel to the axis of ground electrode 2. Shaft 13 is appropriately fastened in block 4 and similarly is made of an insulating material. Because insulating materials ordinarily are prone to rapid wear under conditions of abrasion, guard 14, a ceramic or suitable hard-surfaced metallic ring, is fastened over that area of shaft 13 which may inadvertently come in contact with the moving dielectric material during string-up, adjustment, and other like instances. Adjusting nut 15 is in threaded engagement with shaft 14 as indicated at 16 and is in free sliding engagement with shaft 13 along the surface generally indicated as 17. Adjusting nut 15 is provided with appropriate wrenching surfaces, not visible in the figures, so that it may conveniently be rotated relative to shaft 13 to alter the axial relationship between the two parts. The outer circumferential portion of adjusting nut 15 is in free rotational engagement with bushing 18. Bushing 18 is fastened to the front side of mounting panel 11 by fasteners 19 and 20 which are disposed in arcuate slots 21 and 22, respectively. These arcuate slots 21 and 22 are of sufficient length to permit approximately 30° rotation of ion gun 3 from its nonoperating position as shown in the full lines to its operating position as shown in the broken lines. The fasteners 19 and 20 are not tightened beyond that point at which there is easily obtained a rotational sliding relationship between bushing 18 and mounting panel 11. Pin 23 is pressed through bushing 18 so that it extends into groove 24 machined in the outer surface of adjusting nut 15, and pin 23 is a free sliding fit in groove 24, thus adjusting nut 15 is restrained axially relative to bushing 18. Woodruff key 25 is placed in an appropriate groove in shaft 13 and engages internal groove 26 in bushing 18. Thus bushing 18 is constrained to rotate as shaft 13 rotates while internal groove 26, in sliding engagement with Woodruff key 25, permits shaft 13 to translate relative to bushing 18 upon actuation of adjusting screw 15. Bracket 27 is fastened by a number of fasteners 28 on the back side of mounting panel 11 opposite bushing 18. Mounting bracket 27 is a figure of revolution, and is machined across its upper surface in the area generally indicated by 29 to open the interior thereof over an arc in excess of 30°, permitting actuating plunger 31 of microswitch 30 to be in contact with the outer and rear-ward surface of bushing 18, as shown in the drawing. Microswitch 30 is fastened to mounting bracket 27 by means not shown. A cam groove 32 is machined in the outer surface of bushing 18 and so located that microswitch 30 energizes the high voltage electrical system only when ion gun 3 is in the operative position. Similarily, the interaction of button 31 and groove 32 is such that when the ion gun is in its nonoperative position, the high voltage circuit is turned off. For reasons of safety, microswitch 30 is electrically connected by leads 33 to the low voltage circuit of the appropriate high voltage power supply rather than to the high voltage circuit it controls. Microswitch 30 may also be employed to actuate voltage "on" lights and appropriate alarm indications and control instrumentation as required. High voltage conductor 10 passes through appropriate passages in block 4 and shaft 13. Passing through a hole not shown in spacer block 35 and appropriately retained therein by some means not shown, conductor 10 is fastened to base plate 8 which is fastened to spacer block 35 by one or more fasteners 36. At its other end, conductor 10 is fastened to metal plug 37 which is disposed in an appropriate counterbore in shaft 13. Spring 38 under compression maintains contact within the hollow extremity of plug 37 at one end and at its upper end is fastened to internally threaded fastener 39 which may be a "Rivnut" (a blind rivet with internal threads made by B. F. Goodrich Company, Aviation Products Division) or its equivalent. Fastener 40 passes through a hole in the rear-most portion of mounting bracket 27 and engages the internal threads of fastener 39, thereby continuing the electrical circuit and providing a flexible member therein so that shaft 13 may translate and still maintain electrical continuity. High voltage conductor 10' is appropriately fastened beneath the head of fastener 40 and passes through cooperating grooves in mounting bracket 27 and insulating end cap 41 to the outside and thence to the high voltage power supply. Cap 41 is fastened by means not shown to the mounting bracket 27, there being mantained an appropriately long air gap from fastener 40 to the exterior so that there is no high voltage leakage during operation. Conductor 10' fits snugly in the cooperating grooves mentioned and similarly seals the system against high voltage leakage.

While the principles involved are not fully understood and we do not wish to characterize the invention by the explanation, a simplified and general mechanism is believed to occur somewhat in the following manner: When an electric field is established between a negative point and some target or ground with an intervening air gap, generally in that air gap there are many free ions due to the action of normal background radiation. As the electric field intensity is increased, the free positive ions move under the influence of the field and are accelerated toward the negative point electrode. Upon colliding with that electrode, the ion transfers sufficient kinetic energy to the electrode to overcome the surface work function and, as a result, several electrons are emitted from the electrode. The emitted electrons acquire kinetic energy from the field, and collide with atoms in the air. These collision cause further ionization and the process avalanches. Thus, near the point the electron avalanches produce an ion space charge, and at some distance from the point, the field strength, becomes low enough for the electrons to attach to neutral atoms through electron sharing, and form negative ions which move under the influence of the field toward ground. The process is regenerative and since charge carriers of both signs are generated, eventually the air gap zone stabilizes into three regions. Close to the negative point electrode there is a region which we term bipolar flow. It contains positive ions moving toward the point electrode and a greater number of electrons moving in the direction of the ground. Farther away from the point electrode and beyond or in the region of electron attachment there is a region which we term that of the bipolar cloud, since it contains charge carriers of both signs and is made up of electrons and air atoms which, of course, are mainly nitrogen and oxygen which have either gained or lost an electron. The region between the cloud and the ground plane or target we term the region of unipolar flow. It is substantially comprised of negative ions moving toward the ground plane with perhaps very few electrons contributing to flow in this region. We have discovered that the greatest charging effect at a given set of conditions occurs in this region of unipolar flow and, surprisingly, this effect increases as the distance to the target surface decreases. What is still more surprising, we have found further that when the continuously forwarded dielectric material is even in brushing contact with the target where one might expect discharging to occur, the charging effect is at its maximum for a corona charging system. This contact need be minimal only, in actuality so slight that surface abrasion is not a problem. We have found the the extent of a suitable brushing contact with a cylindrical target element ordinarily need comprise no more than tangential contact over a surface arc of about 3 to 5 degrees.

It will be apparent that the system of the invention is not limited to an atmosphere of air as discussed above but will apply to any atmosphere capable of ionization. Those skilled in the art will recognize that each separate atmosphere has individual ionization characteristics and that adjustments in physical and electrical parameters must be made accordingly.

This system of three regions is shown generally in the schematic representation of FIGURE 5. In this figure, the conditions are indicated in a state of equilibrium and the proportions of the zones are not necessarily true to the actual circumstances but are representative of the principles as we believe them at this time.

Coaxial systems have been studied and may be found in the literature. See "Gaseous Conductors" by J. D. Cobine, Dover Publications Inc., 1958. Drawing on the information contained in this text, we may assume that in a point plane system, the potential as a function of distance from the point electrode to the ground is as shown in FIGURE 6. This curve shows that there is an appreciable drop in potential near the distributor in the bipolar flow and bipolar cloud regions, a very slight drop over a large portion of the unipolar flow region and a drop in close proximity to ground in the unipolar flow region. These drops in potential represent regions in which the electric field intensity is high. The gradient of the potential is shown in FIGURE 7, there being a high electric field intensity in the immediate vicinity of the ground plane and also a high electric field intensity near the distributor. Inasmuch as we have found that the optimum charging location is against ground, it would appear that the optimum filament or fiber charge is related to a combination of field intensity and the density of unipolar charges. Our studies show that this region extends about $\frac{1}{16}$ inch away from the ground electrode with the charge increasing by a factor of 2½ times as the fiber is brought into the brushing contact with the ground when measuring the charge on a single fiber or filament in a 25 kv. system employing a single point and a ground electrode approximately 1 inch in diameter. This is shown in FIGURE 8.

It is well known that the electric field intensity is a function of the radius of curvature of the electrodes employed. We further recognize that the filaments themselves constitute electrodes and the radius of curvature of the filaments has an effect upon the over-all system; however, in practical industrial applications, the radius of curvature of a given filament is determined by end-use requirements and cannot be varied to suit the charging system and we are restricted to regulating the radius of curvature of either the ground or the high-voltage pointed electrode to increase the electric field intensity and the volume charge density. In practical systems decreasing the radius of the high voltage point below that required to initiate corona does not significantly increase the effectiveness of the charge generation and may lead to excessive erosion of the point. Thus it is desirable only to vary the radius of curvature of the ground or target electrode. If the ground is too sharp, the electric field exceeds the critical value and a local breakdown or back corona is established, presumably causing undesirable bipolar flow and cloud around the ground and consequent charge reduction through neutralization.

FIGURE 9 is a plot of the filament charge as a function of the radius of curvature of the ground electrode at a constant electrode voltage. It can be seen that where the ground 2 has a large radius, a small reduction in the radius does not influence the charge level, but as the radius is decreased, the electric field concentrates on a smaller area and so intensifies and builds up the charge density. The critical radius is that radius where filament charge is at a maximum, a further reduction of the radius beyond this value initiating a corona discharge. For a 25 kv. system, we find a ground electrode in the order of one half inch to ¾ inch of optimum radius of curvature.

Practical applications of corona charging involving single filaments are much less frequent than those in which multifilaments are employed. In this latter instance, which is a common one, the filaments occupy a considerable area of the surface of the ground electrodes. Employing a single point, negative electrode, and a cylindrical ground electrode, we find that the fibers are not uniformly charged. FIGURE 10 is a plot of filament charge as a function of its lateral distribution from a point directly opposite the point of the single point electrode in either axial direction. It is known to employ multi-point electrodes and, if such a multi-point electrode is used, a plot of filament charge as a function of location on the ground electrode will appear as the curve of FIGURE 10 at both extremes. Across the central region, the charge will vary roughly sinusoidally with the peaks opposite each of the plurality of points as shown in FIGURE 11. This, then, is also less than a satisfactory condition where a subsequent handling system requires uniform charge on each and every filament so that uniform handling can result. We have discovered that an appropriately contoured insulating shield surrounding the negative electrode can focus the electrical field so that the region of unipolar ion flow is broadened across the area occupied by the filaments. Referring to FIGURE 12, there is shown a single point electrode 9 enclosed in its insulating shield which is cavity 6 in housing 4, which, as described before, is generally rectangular in shape with rounded edges 7. Point 37 of electrode 9 is recessed within cavity 6 as shown in FIGURE 12. Were this not so, some of the ions produced by the field emanating from electrode 9 would escape the main stream of the electric field and radiate laterally into space. With point 37 recessed in cavity 6, these escaping ions are captured. The negative ions impinge on the inner surface 38 of cavity 6 and accumulate thereon to establish an auxiliary electric field which counteracts in part the effects of the primary field. As a result, the radially or laterally moving ions and electrons are directed more generally in a direction toward the ground electrode 2 adding to the charge density thereof. In addition, the side walls of cavity 6, not readily visualized from FIGURE 12, reshape the primary electric field so that the ions focus into a beam-like shape at ground 2, more than doubling the lateral extent of the high charge density area. This is shown in FIGURE 13 for a single point electrode employing the shield of the invention.

Where a large number of filaments are to be charged, more than one such single point electrode may be used and the resultant lateral distribution is changed by the action of the shield from the scalloped or sinusoidal shape previously discussed to a substantially uniform level such as that of FIGURE 13 but extending to a greater amount in both directions. Our experience has shown us that for the 25 kv. system described later, four such points evenly spaced on ¼ inch centers is a preferable arrangement. The spacing and the number of points is determined by the particular system, especially by the width of the band of filaments to be charged. Generally, the wider the band, the more points needed. Under certain conditions, a nonuniform spacing may be required to correct for interactions between points if a uniformly focused high charge area is to be obtained. The band-like form of the filaments, so that they are substantially side-by-side and generally only one filament thick, is important to achieving optimum charge in that one filament does not shield other filaments lying beneath it. This band-like shape may be accomplished by the ground electrode itself or by other guiding means.

The material of construction of the shield or body 4 can, in actuality, be either conductive or insulating, the production of the focusing effect not requiring either condition. If, however, it is conductive, the external surfaces must be insulated electrically to protect operating personnel. Also, if the shield is conductive, more care must be exercised in its manufacture as concerns dimensions and machining of surfaces. Thus, we prefer to use an insulating material.

The discussion has been in terms of a negative point and a ground positive to that point. For a positive point, the underlying mechanism would be slightly different without changing the essence of either the explanation or the invention. In practice, we have found a negative point to be slightly more efficient than a positive point. The advantages of negative corona over positive corona are: a more stable flow of ions, larger ion current before arcing occurs, and a lower generation rate of ozone.

In the copending application of Kinney, S.N. 859,614, now abandoned, there is described a system for charging filaments and employing the resultant electrostatic forces in a manner producing a nonwoven web. In that application there is suggested the use of corona charging of the prior art as an alternate or equivalent to the therein preferred triboelectric charging system. However, the corona charging process and apparatus of the instant invention produces a four-fold increase in filament charging level over and above that of the prior art and, furthermore, this is accomplished at a relatively low power input, approximately 8 watts being required to charge 200 filaments. At these high charge levels, other effects may occur. If the highly charged filaments are confined to a small volume the collective charge on the filaments may create a field sufficient to ionize the surrounding air causing a back corona and loss of charge. In such an instance the preferred solution is to increase the spacing between the fibers. When less than maximum charge is tolerable the filament initiated back corona may be reduced by decreasing the power supply current, passing the filaments through a less intense charging area or by otherwise reducing the ion density.

As an example of an operating system according to the preferred embodiment of the instant invention, the following description is given. A commercial radio frequency type power supply was used. This was a Model 2040 unit made by Spellman High Voltage Co., New York, New York, having a negative D.C. output continuously variable from 12 to 40 kv. with a current output of 1 milliampere at 30 kv.; input to the high voltage power supply was from 117 volt 60 cycle source. Ion gun 3 was fabricated entirely in plastic except for electrical conductors and fasteners. Base plate 8 was stainless steel; each of the four electrodes 9 was made of heat-treated K Monel metal, ⅝ inch in length and 0.0555 to 0.0560 inch in diameter. At the unattached end of electrodes 9, a 3/32 inch long taper was machined, terminating in a tip having a radius of curvature ranging from 0.0025 to 0.0030 inch. Electrodes 9 were spaced ¼ inch apart. Cavity 6 was machined in block 4 in substantially rectangular form ⅜ inch wide by 1.5 inch long by ⅝ inch deep. Edges 7 were radiused with a ⅛ inch radius. The mounting was so disposed that the tips of electrodes 9 were ⅛ inch below the surface 5 of housing 4. Ion gun 3 was positioned, as previously described, so that in operating position the row of electrodes 9 was parallel to the rotational axis of ground electrode 2 which was in the form of a right circular cylinder fabricated from stainless steel and having a radius of $^{19}\!/_{32}$ inch. Ion gun 3 and ground electrode 2 were spatially related such that the distance from point to ground was ⅝ inch. The surface of ground electrode 2 was grit-blasted and chrome-plated to a 75 R.M.S. finish and filaments 1 were so constrained by other parts of the system, not shown in the figures, to be in brushing contact with the surface of ground electrode 2 over an arc not in excess of 5 degrees. Two hundred filaments of polyethylene terephthalate of about 1½ denier per filament, spread over approximately 1 inch of ribbon width on ground electrode 2, were chraged to an average level 21.6 microcoulombs/meter$^2$ or about 80% of the theoretical maximum charge on an equivalen conductor. The applied voltage was 25 kv. and input power of about 8 watts was required.

Experience with this system has shown us that if electrodes 9 are spaced much more than ¼ inch apart, it becomes difficult to obtain a uniform field. We have further found that increasing the height or aperture of cavity 6 requires increasing the amount of recess of the points of electrodes 9 below face 5 of block 4 with acceptable results obtained with the cavity width between ⅛ inch and ⅜ inch and the point recess between 0 and ½ inch. Preferred operation was at ⅛ inch recess and ¼ inch spacing, respectively, as stated.

The preceding example shows application of this invention to the charging of polyethylene terephthalate. The invention is applicable to all such discrete dielectric materials including synthetic organic polymeric material such as polyhexamethylene adipamide, the caproamides, the acrylic fibers and indeed all of the synthetics employed in the textile art capable of holding a charge. Similarly non-synthetic organic materials may be used as may inorganic materials. Thus, the invention with obvious modifications that would suggest themselves to those working in the field may be applied to the charging of fibers of glass.

It will be understood that the carrying out of the improved process is not necessarily limited to the operation of the devices shown in the drawings and otherwise discussed in this specification, but may be carried out otherwise as will be suggested to those skilled in the art. For example, additional ion focusing and accelerating means might be used for further distribution of the charging zone where required. The scope of the invention is as defined in the claims.

We claim:

1. Improved apparatus for establishing and maintaining a corona electrostatic field for the treatment of moving discrete elements of dielectric material, said apparatus comprising, in combination, a first electrode unit adapted to receive a high potential electrical charge and a second electrode unit spaced therefrom and adapted to receive a level of electrical potential significantly different from that of said first electrode unit, said electrode units constructed and arranged to establish and maintain between them a region of unipolar ion flow, said first electrode unit comprising a plurality of laterally spaced pointed elements generally extending toward said second electrode unit and arranged in a line transversely to the direction of material movement and in opposed aligned relation to said second electrode unit, said first electrode unit further comprising a shield member surrounding said pointed elements said shield member provided with structure defining a focusing aperture generally positioned between said pointed elements and said second electrode unit; said shield member, said shield structure defining said aperture, and said second electrode unit all constructed and arranged to direct and focus a maximum flow of unipolar ions through a predetermined space immediately adjacent said second electrode.

2. The improved apparatus of claim 1 in which said shield member is formed of a dielectric material.

3. The improved apparatus of claim 2 in which said pointed elements terminate within the outer limits of the shield member structure which define the focusing aperture.

4. The improved apparatus of claim 3 in which said second electrode unit is provided with an elongated member extending transversely across the direction of material movement and in alignment with the line of points of said first electrode unit, said elongated member provided with a smoothly curved surface to smoothly engage and guide the moving material.

5. The improved apparatus of claim 4 in which the predetermined space through which the unipolar ion flow is focused is generally defined by a locus of points positioned at distances no greater than one sixteenth of an inch from the surface of said second electrode unit.

6. The improved apparatus of claim 5 in which the curved surface of said second electrode unit is provided with a general radius of curvature of between about one half and about three quarters of an inch.

7. The improved apparatus of claim 6 which is adapted to handle discrete elements of dielectric material in the form of discrete filamentary structures of synthetic organic polymeric compositions.

8. The improved apparatus of claim 7 which is especially adapted to treat filamentary structures of a continuous nature.

9. The improved apparatus of claim 1 in which said first electrode unit is mounted for movement between a first position in operative relationship with said other electrode unit and said moving material and a second position spaced therefrom in inoperative relation to said other electrode unit and moving material.

10. The improved apparatus of claim 9 which further comprises an electrical means in operative association with said electrode units for energizing at least one of said electrodes, said electrical means cooperating with said movable first electrode unit so that said electrode units are energized only when said first electrode unit is in said first position of operative relationship with the second electrode unit and said material.

11. The improved apparatus of claim 10 in which said first electrode unit is connected to said electrical means to be charged, in said first position, to a high negative charge and said second electrode unit is connected to electrical ground.

12. Improved apparatus for establishing and maintain- a corona electrostatic field for separating and applying forwarding forces to moving discrete elements of filamentary dielectric material, said apparatus comprising, in combination, a first electrode unit adapted to receive a high potential electrical charge and a second electrode unit spaced therefrom and adapted to receive a level of electrical potential significantly different from that of said first electrode unit, said electrode units constructed and arranged to establish and maintain between them a region of unipolar ion flow, said first electrode unit comprising a plurality of laterally spaced pointed elements generally extending toward said second electrode unit and arranged in a line transversely to the direction of material movement and in opposed aligned relation to said second electrode unit, said first electrode unit further comprising a shield member surrounding said pointed elements said shield member provided with structure defining a focusing aperture generally positioned between said pointed elements and said second electrode unit; said shield member, said shield structure defining said aperture, and said second electrode unit all constructed and arranged to direct and focus a maximum flow of unipolar ions through a predetermined space immediately adjacent said second electrode to develop electrostatic separating and forwarding forces in the filamentary elements passing through said predetermined space.

13. Improved apparatus for electrically separating and forwarding discrete elements of dielectric materials generally in a given direction between a first position and a second position spaced therefrom, said apparatus comprising in combination, a first electrode unit near the first position a second electrode near said first position, means connected to said electrodes for applying a high potential electrical charge to said first electrode unit and a significantly different level electrical potential to said second electrode, the electrode units so constructed, arranged, and spaced relative to each other, and the differential charge between said electrode units of such a magnitude, that a corona charging zone is established between said electrode units with region of unipolar ion flow maintained in the vicinity of said first position and said second electrode, and means for introducing discrete elements of dielectric material into the corona charging zone and directing said elements through the vicinity of said second electrode to be acted upon by said unipolar ion flow and receive maximum separating and accelerating action toward said second position.

References Cited in the file of this patent
UNITED STATES PATENTS

| | | |
|---|---|---|
| 2,588,699 | Carlson | Mar. 11, 1952 |
| 2,740,184 | Thomas | Apr. 3, 1956 |
| 2,864,756 | Rothacker | Dec. 16, 1958 |
| 2,934,650 | De Witt | Apr. 26, 1960 |
| 2,977,475 | Kassenbeck | Mar. 28, 1961 |